United States Patent [19]

Takanashi et al.

[11] Patent Number: 4,831,452
[45] Date of Patent: May 16, 1989

[54] IMAGE PICKUP DEVICE HAVING A PHOTOCONDUCTIVE OPTICAL MODULATOR ELEMENT

[75] Inventors: Itsuo Takanashi, Kamakura; Shintaro Nakagaki, Fujisawa; Makoto Iwahara, Sagamihara; Hirohiko Shinonaga, Yokohama; Masato Furuya, Yokosuka; Tsutou Asakura, Yokohama, all of Japan

[73] Assignee: Victor Company of Japan Ltd., Kanagawa, Japan

[21] Appl. No.: 139,005

[22] Filed: Dec. 29, 1987

[30] Foreign Application Priority Data

Dec. 30, 1986 [JP] Japan ................................. 61-311333
Dec. 31, 1986 [JP] Japan ................................. 61-310768
Jan. 19, 1987 [JP] Japan ................................. 62-9388

[51] Int. Cl.$^4$ ............................................. H04M 3/14
[52] U.S. Cl. ............................ 358/213.14; 358/213.13; 358/209
[58] Field of Search ................... 358/213.14, 213.11, 358/213.13, 209, 217

[56] References Cited

U.S. PATENT DOCUMENTS

| | | | |
|---|---|---|---|
| 3,577,200 | 5/1971 | Aldrich | 358/213.13 |
| 3,716,747 | 2/1973 | Patel | 358/213.13 |
| 3,865,975 | 2/1975 | Fletcher et al. | 358/213.14 |
| 4,641,193 | 2/1987 | Glenn | 358/213.13 |
| 4,727,427 | 2/1988 | Kime | 358/217 |

OTHER PUBLICATIONS

"O Plus E", No. 86, Jan./1987; published by Shingijutsu Communications Inc., Japan, pp. 64–68 and 81–87.

Primary Examiner—Jin F. Ng
Assistant Examiner—Stephen Brinich
Attorney, Agent, or Firm—Michael N. Meller

[57] ABSTRACT

An image pickup device includes an optical modulator element for storing information corresponding to an optical image formed thereon, an imaging lens for forming an optical image of an object on the optical modulator element, and a device for reading the optical image information from the optical modulator element and for generating information corresponding to the optical image of the object formed on the optical modulator element.

25 Claims, 15 Drawing Sheets

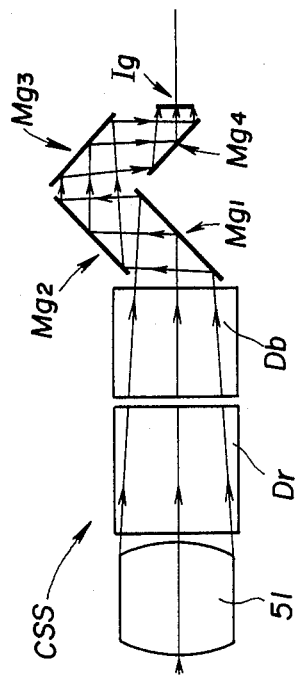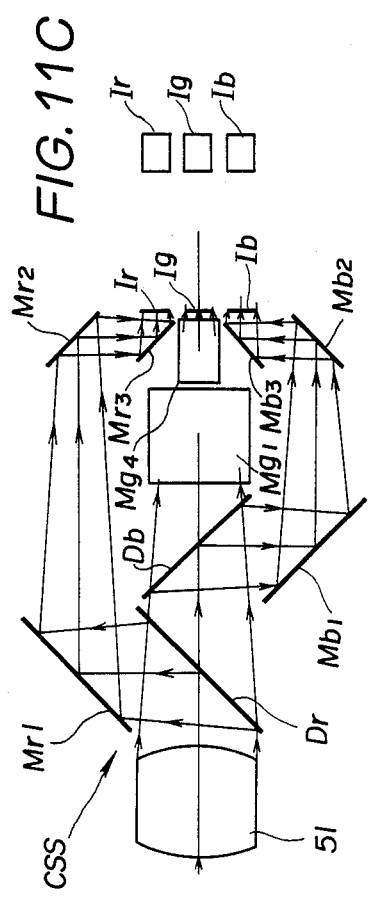

FIG.16
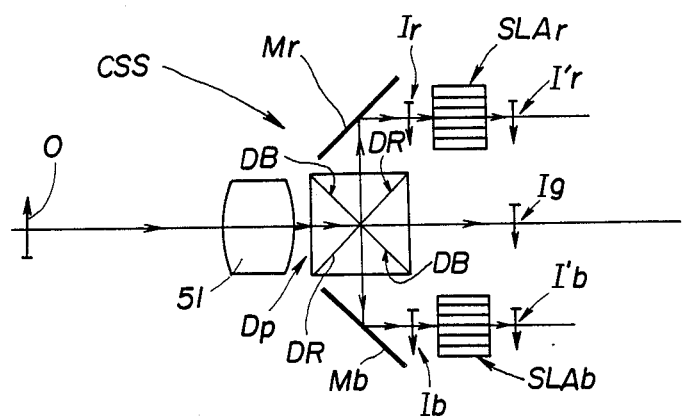
FIG.17A
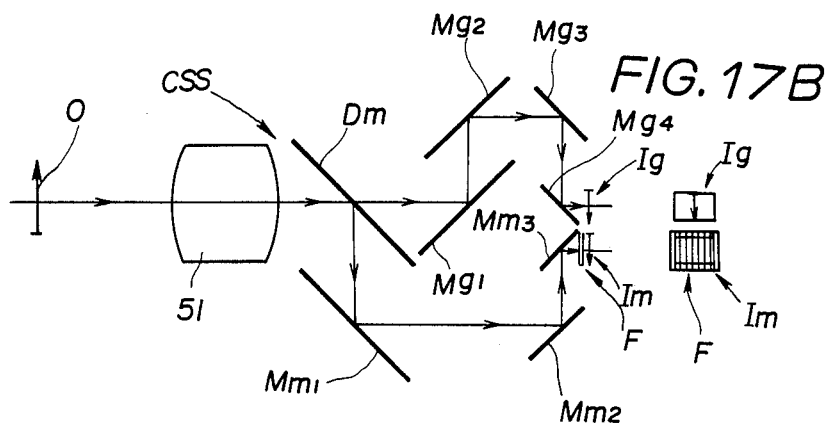
FIG.17B

FIG. 18
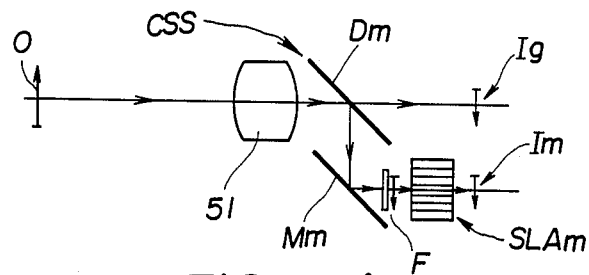
FIG. 19A
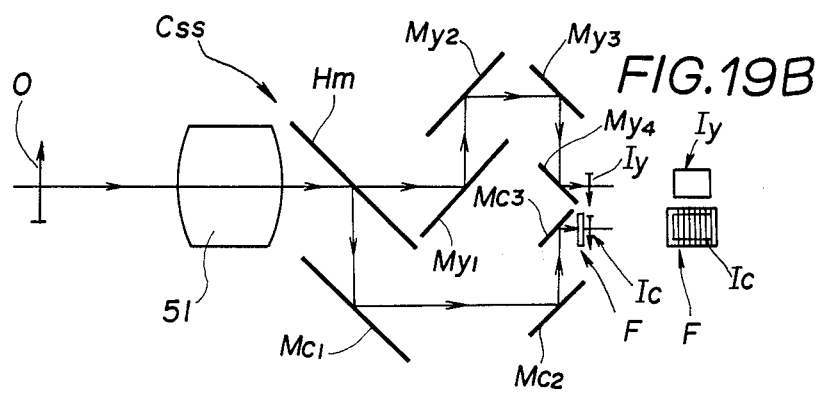
FIG. 19B
FIG. 20
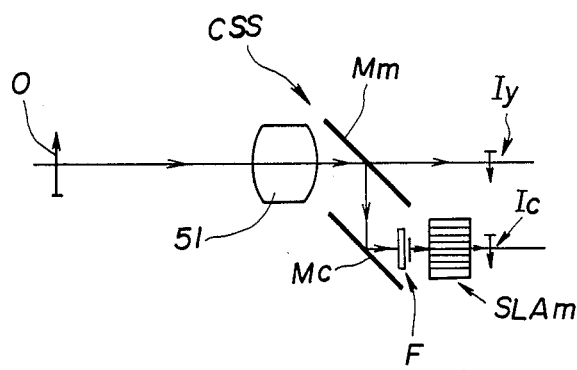

IMAGE PICKUP DEVICE HAVING A PHOTOCONDUCTIVE OPTICAL MODULATOR ELEMENT

BACKGROUND OF THE INVENTION

The present invention generally relates to image pickup devices, and more particularly to an image pickup device having a high resolution and applicable to a movie camera for taking moving pictures, a still camera for taking still pictures and the like.

A video signal which is obtained by picking up an optical image of an object on an image pickup device can be subjected to a video signal processing with ease. The video signal processing includes editing, trimming and the like. In addition, such a video signal can be recorded and reproduced on and from a reversible recording medium with ease, where a recorded signal is erasable for repeated recording and playback.

On the other hand, in the image pickup device which is conventionally used to generate the video signal, an image formation of the optical image of the object is made on a photoelectric conversion part of an imaging element (photoelectric transducer) by use of an imaging lens. The optical image of the object is converted into an electrical image signal in the photoelectric conversion part of the imaging element. The electrical image signal is outputted sequentially on the time base as the video signal. As is well known, various kinds of pickup tubes and various kinds of solid state image sensors are used as the imaging element of the image pickup device.

Recently, there is much demand to reproduce a picture of both picture quality and resolution considerably higher than those of the currently utilized television systems. In accordance with such a demand, the so-called extended definition television (EDTV) and high definition television (HDTV) systems have been proposed for the purpose.

In order to obtain a picture of high picture quality and resolution, the image pickup device must be able to generate a video signal which enables a reproduction of the picture of high picture quality and resolution.

In the case of the image pickup device which uses the pickup tube as the imaging element, it is possible to consider reducing a diameter of an electron beam or increase a target area for the purpose of generating the video signal which enables the reproduction of the picture of high picture quality and resolution.

However, there is a limitation for reducing a diameter of an electron beam due to the performance of an electron gun, the structure of a convergence system and the like. For this reason, the realization of the high resolution by reducing the electron beam diameter cannot be expected.

On the other hand, since a target capacitance of the pickup tube increases with the target area, high-frequency components in the output signal of the pickup tube become degraded as the target capacitance increases and a deterioration in a signal-to-noise (S/N) ratio of the output signal of the pickup tube becomes untolerable. Furthermore, in the case of the image pickup device for use in taking moving pictures, a frequency range of the video signal becomes several tens of MHz to several hundreds of MHz and causes problems in view of the S/N ratio. Hence, the realization of the high resolution by increasing the target area seems not practical.

For these reasons, it is extremely difficult to generate a video signal which enables the reproduction of the picture of high picture quality and resolution from the image pickup device using the pickup tube as the imaging element.

On the other hand, in the case of the image pickup device which uses the solid state image sensor as the imaging element, it is conceivable to use a solid state image sensor having a large number of picture elements (pixels) for the purpose of generating the video signal which enables the reproduction of the picture of high picture quality and resolution. But a clock signal which drives the solid state image sensor having the large number of picture elements naturally requires to be a high frequency. For example, in the case of the image pickup device for use in taking moving pictures, the clock signal for driving the solid state image sensor has a high frequency in the order of several hundreds of MHz. In addition, an electrostatic capacitance of the associated circuit which is driven increases as the number of picture elements increases. Since an upper limit frequency of the clock signal for driving the solid state image sensor is presently believed to be approximately 20 MHz, it is virtually impossible from the practical point of view to use the solid state image sensor as the imaging element for the purpose of generating the video signal which enables the reproduction of the picture of high picture quality and resolution.

Therefore, in the conventional image pickup device, it is impossible to satisfactorily generate a video signal which enables a reproduced picture of high picture quality and resolution, due to the limitations of the imaging element which is used. Thus, there is much demand to realize an image pickup device which has no such limitations thus enables to generate a video signal of the reproduced picture of high picture quality and resolution.

SUMMARY OF THE INVENTION

Accordingly, it is a general object of the present invention to provide a novel and useful image pickup device in which the problems described heretofore are eliminated and the above mentioned demand is satisfied.

Another and more specific object of the present invention is to provide an image pickup device having an optical modulator element for storing information corresponding to an optical image which is formed thereon, an imaging device including an imaging lens for forming an optical image of an object on the optical modulator element, and a reading device for reading the optical information from the optical modulator element and for generating information corresponding to the optical image of the object formed on the optical modulator element. According to the image pickup device of the present invention, it is possible to generate image information which enables reproduction of a picture of high quality and resolution due mainly to the fact that the optical modulator element employed on the present invention has none of the drawbacks inherent in the aforementioned image pickup tubes and solid state image sensors.

Still another object of the present invention is to provide an image pickup device having an optical modulator element, an imaging device including an imaging lens for forming an optical image of an object on the optical modulator element, a reading device for reading the optical information from the optical modulator element and for generating information corresponding to the optical image of the object formed on the optical modulator element, an optically sensitive reqritable member for storing information corresponding to an optical image formed thereon, and a writing device for writing the image information generated from the reading device on the optically sensitive rewritable member. According to the image pickup device of the present invention, it is possible to generate image information which enables reproduction of a picture of high quality and resolution. In addition, the image information stored in the optically sensitive rewritable member may be stored for a long period of time depending on the needs. Furthermore, it is possible to simultaneously pickup the optical image information by use of the optical modulator element while reading out the previously stored optical image information from the optically sensitive rewritable member.

A further object of the present invention is to provide an image pickup device in which the writing device projects the optical image information read by the reading device on the optically sensitive rewritable member as information representing the image of the object picked up by the imaging device.

Another object of the present invention is to provide an image pickup device which further includes a color separation system for separating the optical image information from the imaging lens into two or more optical images of mutually different wavelengths, so that the two or more optical images are formed at independent regions on the optical modulator element.

Another object of the present invention is to provide an image pickup device which uses as the optical modulator element a modulator element provided with a mirror having a wavelength selecting characteristic. According to the image pickup device of the present invention, there is no need to supply an erasing light for erasing the optical information from the side of the imaging lens, and the construction of the image pickup device can be simplified.

Other objects and further features of the present invention will be apparent from the following detailed description when read in conjunction with the accompanying drawings.

BRIEF DESCRIPTION OF THE DRAWINGS

FIGS. 11A through 11C, 12A through 12C, and 13 show embodiments of a color separation system of the eighth embodiment together with an essential part of the image pickup device;

FIGS. 16 through 22 show other embodiments of the color separation system of the eighth embodiment together with an essential part of the image pickup device;

DETAILED DESCRIPTION

Figure 1:
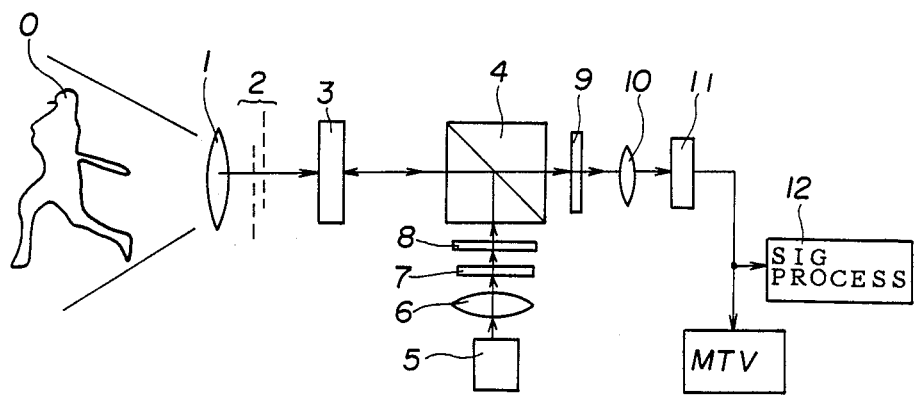
FIG. 1 generally shows a first embodiment of the image pickup device according to the present invention.

First, a description will be given on a first embodiment of the image pickup device according to the present invention, by referring to FIG. 1. In FIG. 1, the image pickup device generally comprises an imaging lens 1, an optical shutter 2 which is provided when the image pickup device is applied to a shutter camera with a shutter, a reversible storage member (hereinafter simply referred to as an optical modulator element) 3 which has a function of storing information of an optical image formed thereon, a semitransparent prism 4, a light source 5 for supplying a reading light such as a laser beam for use in reading an optical image information from the optical (light) modulator element 3, lenses 6 and 10, an optical scanner 7, polarizing plates 8 and 9 which are used according to the needs when the reading light from the light source 5 is a laser beam, an photoelectric conversion element 11, a signal processing circuit 12 and a monitoring television receiver MTV.

An image formation of an optical image of an object O is made on the optical modulator element 3 through the imaging lens 1. In the case where the image pickup device is applied to the shutter camera, the image formation of the optical image of the object O is of course made on the optical modulator element 3 through the imaging lens 1 and the optical shutter 2 which is open.

For example, a liquid crystal optical modulator element, a photoconductive Pockels cell, a spatial light modulator element such as a microchannel light modulator, an element constituted by a photochromic material and the like may be used as the optical modulator element 3.

As the optical scanner 7, it is possible to use a known optical scanner using a rotary mirror, a known optical scanner using an electro-optic element, a known optical scanner using a cathode ray tube (CRT) as a flying spot and the like. In the case of the optical scanner using the CRT, the CRT replaces the light source 5 so that the light emitted from the optical scanner 7 is directed to the lens 6. Any of such optical scanners may be used as the optical scanner 7 depending on the desired performance.

For example, a photodiode, line sensor and the like may be used as the photoelectric conversion element 11. In the case where the line sensor is used as the photoelectric conversion element 11, measures are taken so that the light source 5 in combination with the lens 6 (optical system) emits such a line of light, at the position of the line sensor, that extends along a main scanning direction in which cells of the line sensor are aligned, for example. In this case, the optical scanner 7 may scan the line of light only in a sub scanning direction perpendicular to the main scanning direction or the line sensor may be moved back and forth in the sub scanning direction to read the optical information from the optical modulator element 3.

Figure 2:
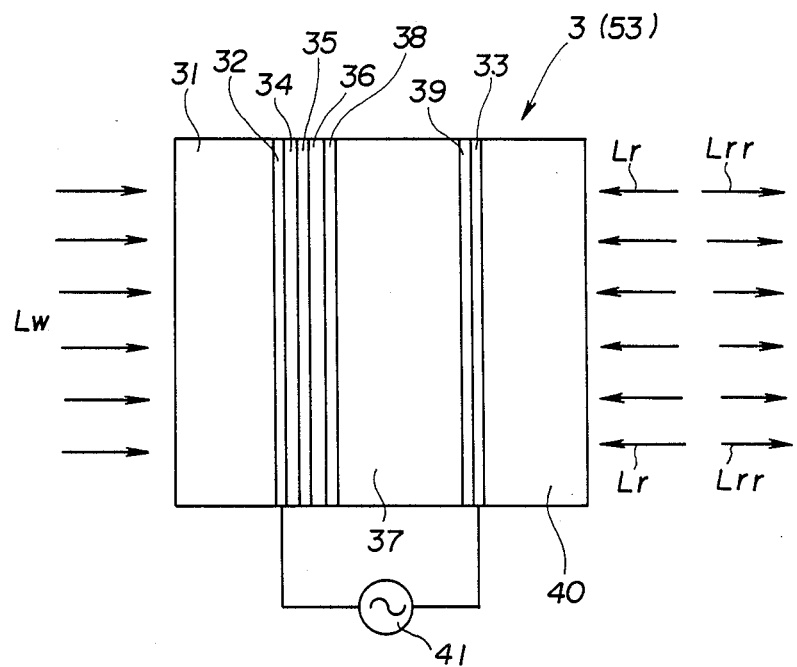
FIG. 2 shows a first embodiment of a reversible storage member of the image pickup device.

FIG. 2 shows an embodiment of the optical modulator element 3. In FIG. 2, the optical modulator element 3 is constituted by a liquid crystal optical modulator element comprising a glass plate 31, transparent electro-conductive electrode layers 32 and 33, a photoconductive layer 34, a stopper layer 35, a dielectric mirror 36, a nematic liquid crystal layer 37, liquid crystal aligning layers 38 and 39 and an optical glass substrate 40. The liquid crystal aligning layers 38 and 39 together with the nematic liquid crystal layer 37 constitute an optical modulator layer. The dielectric mirror 36 is an electrically insulative mirror having multiple layers overlayed by an evaporation process, and materials for the layers may be selected from $SiO_2$, $TiO_2$, ZnS and $Na_3Al_6$. An A.C. power source 41 supplies a voltage to the liquid crystal optical modulator element for applying an electrical field thereto. The liquid crystal aligning layers 38 and 39 are provided so that the orientation of an optical axis of molecules in the nematic liquid crystal layer 37 becomes twisted by 45° between the transparent electro-conductive electrode layers 32 and 33. In FIG. 2, Lw denotes a writing light and Lr denotes a reading light.

When the incoming optical image of the object O to the optical modulator element 3 shown in FIG. 2 is passed through the glass plate 31 and the transparent electro-conductive electrode layer 32 and the image formation of the optical image is made on the photoconductive layer 34, an electrical resistance of the photoconductive layer 34 changes depending on the intensity of the formed optical image. The stopper layer 35 is a dielectric layer for blocking the reading light Lr from penetrating so that the electrical resistance of the photoconductive layer 34 will not be affected by the reading light Lr projected from the other side. The stopper layer 35 may be made of CdTe by an evaporation process.

The liquid crystal within the nematic liquid crystal layer 37 is driven with an electrical field built up between the two electrode layers 32 and 33 dependent on the optical image of the object O, through the photoconductive layer 34, the stopper layer 35, the dielectric mirror 36 and the liquid crystal aligning layer 38 which are thin enough so that the electrical field is less affected. As a result, the optical axis of the molecules in the nematic liquid crystal layer 37 becomes no longer parallel to the transparent electro-conductive electrode layers 32 and 33. In the case where the reading light Lr from the light source 5 is projected to the optical glass substrate 40 of the optical modulator element 3 by way of the lens 6, the optical scanner 7, the polarizing plate 8 which is provided when necessary and the semitransparent prism 4, a reflected light Lrr of the reading light Lr by the dielectric mirror 36 is generated by a double refraction effect occurring in the nematic liquid crystal layer 37. Therefore, an optical image of the object O appears on the optical glass substrate 40 of the optical modulator element 3.

When the reading light Lr is projected to the optical glass substrate 40 of the optical modulator element 3, the reflected light Lrr of the reading light Lr from the optical modulator element 3 reaches the photoelectric conversion element 11 by way of the semitransparent prism 4, the polarizing plate 9 which is provided when necessary and the lens 10.

Accordingly, the image formation of the optical image of the object O appearing on the optical glass substrate 40 is made on the photoelectric conversion element 11 by the lens 9. A video signal corresponding to the optical image of the object O is thus outputted from the photoelectric conversion element 11 and is supplied to the monitoring television receiver MTV and the signal processing circuit 12.

In the first embodiment of the image pickup device, no pickup tube is used to generate the video signal. Instead, the image formation of the optical image of the object O is made on the optical modulator element 3. An optical information is obtained by scanning a high-definition image corresponding to the optical image of the object O formed on the optical modulator element 3 by a light of minute dimension, and this optical information is subjected to a photoelectric conversion in the photoelectric conversion element 11. As a result, a video signal corresponding to the optical image of the object O is generated from the photoelectric conversion element 11. For this reason, a video signal which enables a reproduction of a picture of extremely high picture quality and resolution can be generated with ease. In addition, it is possible to carry out a predetermined signal processing such as editing and electronic picture trimming in the signal processing circuit 12.

Figure 3:
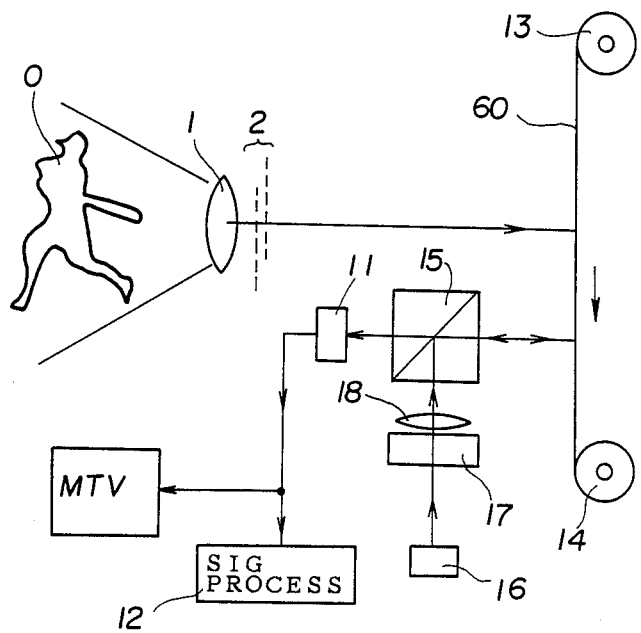
FIG. 3 generally shows a second embodiment of the image pickup device according to the present invention.

Next, a description will be given on a second embodiment of the image pickup device according to the present invention, by referring to FIG. 3. In FIG. 3, those parts which are the same as those corresponding parts in FIG. 1 are designated by the same reference numerals, and a description thereof will be omitted.

In FIG. 3, a reversible tape storage member (hereinafter simply referred to as a tape) 60 which has a function of storing information of an optical image formed thereon is used in place of the optical modulator element 3. This tape 60 is provided across a supply reel 13 and a take-up reel 14.

Instead of the semitransparent prism 4, the light source 5, the lens 6, the optical scanner 7 and the polarizing plates 8, the present embodiment uses a semitransparent prism 15, a light source 16 for supplying a reading light for use in reading an optical image information from the tape 60, an optical scanner 17 and a lens 18.

It is possible to use as the tape 60 a reversible storage medium of an arbitrary form other than the tape, such as a disc and a sheet. In addition, an arbitrary recording material which is flexible may be used for the tape 60 as long as the reversibility of the tape 60 is maintained in this regard, the reversibility meaning that the recorded information on the material is erasable for rewriting at least optically and re-readable by some means. Examples of such a recording material are a photochromic material, thermoplastic film and a photomagnetic material. The reversible storage medium may take a form of a cassette which accommodates the tape 60.

When the photomagnetic material is used as the recording material of the tape 60, it is of course necessary to provide an analyzer in an optical system which is used to read from the tape 60 the stored optical image information corresponding to the optical image of the object O.

As the optical scanner 17, it is possible to use those optical scanners usable as the optical scanner 7 described before in conjunction with the first embodiment of the image pickup device. In the case where the optical scanner using the CRT is used as the optical scanner 17, the arrangement may be the same as the manner in the first embodiment.

In the case where the line sensor is used as the photoelectric conversion element 11, measures are taken so that the light source 16 in combination with the lens 18 (optical system) emits such a line of light, at the position of the line sensor, that extends along a main scanning direction in which cells of the line sensor are aligned, for example. In this case, the optical scanner 17 may scan the line of light only in a sub scanning direction perpendicular to the main scanning direction or the line sensor may be moved back and forth in the sub scanning direction to read the optical information from the tape 60. In addition, when the tape 60 is transported in the sub scanning direction when reading the optical information from the tape 60, it is unnecessary to move the line sensor back and forth in the sub scanning direction.

The image pickup device shown in FIG. 3 is provided with a driving mechanism (not shown) for driving at least the take-up reel 14 so that the tape 60 supplied from the supply reel 13 is taken up on the take-up reel 14. Such a driving mechanism for driving the reel is well known, and a description and illustration thereof is omitted for this reason.

When the image pickup device shown in FIG. 3 is applied to the shutter camera, the optical shutter 2 is opened for a predetermined time and then shut, thereby making the image formation of the optical image of the object O on the tape 60. After this image formation is made, the tape 60 is transported a distance of one picture frame by being taken up on the take-up reel 14.

On the other hand, when the image pickup device shown in FIG. 3 is applied to the movie camera, the tape 60 is transported frame by frame by intermittently taking up the tape 60 on the take-up reel 14. In other words, the tape 60 is stationary for a predetermined time, and after the image formation of the optical image of the object O is made on the stationary tape 60 so as to store one picture frame, the tape 60 is quickly transported a distance of one picture frame by being taken up on the take-up reel 14, and such a sequence of operations is repeated. A transporting mechanism similar to a known transporting mechanism of a movie film camera may be used to transport the tape 60 intermittently.

According to the second embodiment of the image pickup device, the optical image information stored in the tape 60 and corresponding to the optical image of the object O is read as an optical information obtained by carrying out the scanning by a beam of light of minute dimension. Thereafter, the read optical information is subjected to the photoelectric conversion and converted into the video signal corresponding to the optical image of the object O.

In the second embodiment of the image pickup device, no pickup tube is used to generate the video signal. Instead, the image formation of the optical image of the object O is made on the tape 60. An optical information is obtained by scanning a high-definition recorded image on the tape 60, which is a transformation of the corresponding optical image of the object O formed on the tape 60 by a beam of light of minute dimension, and this optical information is subjected to a photoelectric conversion in the photoelectric conversion element 11. As a result, a video signal corresponding to the optical image of the object O is generated from the photoelectric conversion element 11. For this reason, a video signal which enables a reproduction of a picture of extremely high picture quality and resolution can also be generated with ease in the present embodiment. In addition, it is possible to carry out a predetermined signal processing such as editing and electronic picture trimming in the signal processing circuit 12.

Figure 4:
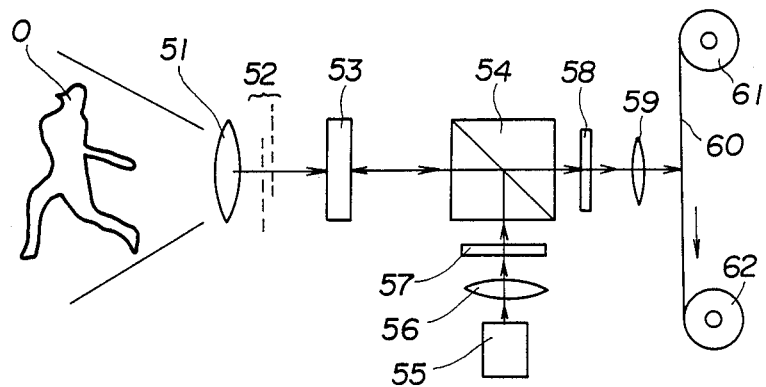
FIGS. 4 through 8 generally show third through seventh embodiments of the image pickup device according to the present invention, respectively.

Next, a description will be given on a third embodiment of the image pickup device according to the present invention, by referring to FIG. 4. In FIG. 4, the image pickup device generally comprises an imaging lens 51, an optical shutter 52 which is provided when the image pickup device is applied to a shutter camera with a shutter, an optical (light) modulator element 53 which has a function of storing information of an optical image formed thereon, a semitransparent prism 54, a light source 55 for supplying a reading light such as a laser beam for use in reading an optical image information from the optical modulator element 53, lenses 56 and 59, polarizing plates 57 and 58 which are used according to the needs when the reading light from the light source 55 is a laser beam and the reversible tape storage member 60 which has a function of storing information of an optical image formed thereon. In FIG. 4, a reversible tape storage medium (hereinafter simply referred to as a tape) is used as the storage member 60. This tape 60 is provided across a supply reel 61 and a take-up reel 62.

An image formation of an optical image of an object O is made on the optical modulator element 53 through the imaging lens 51. In the case where the image pickup device is applied to the shutter camera, the image formation of the optical image of the object O is of course made on the optical modulator element 53 through the imaging lens 51 and the optical shutter 52 which is open.

For example, a liquid crystal optical modulator element, a photoconductive Pockels cell, a spatial light modulator element such as a microchannel light modulator, an element constituted by a photochromic material and the like may be used as the optical modulator element 53. It is not essential that the optical modulator element 53 has the function of storing an optical information.

The liquid crystal optical modulator element shown in FIG. 2 may be used as the optical modulator element 53. In the case where the reading light Lr from the light source 55 is projected to the optical glass substrate 40 of the optical modulator element 53 by way of the lens 56, the polarizing plate 57 which is provided according to the needs and the semitransparent prism 54, the reflected light Lrr of the reading light Lr is generated by a double refraction effect occurring in the nematic liquid crystal layer 37. Therefore, an optical image of the object O appears on the optical glass substrate 40 of the optical modulator element 53.

When the reading light Lr is projected to the optical glass substrate 40 of the optical modulator element 53, the reflected light Lrr of the reading light Lr from the optical modulator element 53 is applied to the tape 60 by way of the semitransparent prism 54, the polarizing plate 58 which is provided when necessary and the lens 59.

Accordingly, the image formation of the optical image of the object O appearing on the optical glass substrate 40 is made on the tape 60 by the lens 59.

The image pickup device shown in FIG. 4 is provided with a driving mechanism (not shown) for driving at least the take-up reel 62 so that the tape 60 supplied from the supply reel 61 is taken up on the take-up reel 62. Such a driving mechanism for driving the reel is well known, as described before.

When the image pickup device shown in FIG. 4 is applied to the shutter camera, the optical shutter 52 is opened for a predetermined time and then shut, thereby making the image formation of the optical image of the object O on the tape 60. After this image formation is made, the tape 60 is transported a distance of one picture frame by being taken up on the take-up reel 62.

On the other hand, when the image pickup device shown in FIG. 4 is applied to the movie camera, the tape 60 transported frame by frame by intermittently taking up the tape 60 on the take-up reel 62. In other words, the tape 60 is stationary for a predetermined time, and after the image formation of the optical image of the object O is made on the stationary tape 60 so as to store one frame of picture, the tape 60 is quickly transported a distance of one picture frame by being taken up on the take-up reel 62, and such a sequence of operations is repeated. A transporting mechanism similar to a known transporting mechanism of a movie film camera may be used to transport the tape 60 intermittently.

It is possible to use as the tape 60 a reversible storage medium of an arbitrary form other than the tape, such as a disc and a sheet. In addition, an arbitrary recording material may be used for the tape 60 as explained before for the tape 60 shown in FIG. 3.

In the third embodiment of the image pickup device, no pickup tube is used to generate the image information. Instead, the image formation of the optical image of the object O is made on the tape 60 and is stored as a recorded image information of a high-definition image corresponding to the optical image of the object O. For this reason, an image information which enables a reproduction of a picture of extremely high picture quality and resolution can be obtained with ease from the recorded image information. Further, the recorded image information may be read from the tape 60 at an arbitrary time, thus enabling the storage of the recorded information to be kept for a long period of time when needed. In addition, it is possible to simultaneously pickup the optical image information from the optical modulator element 53 while reading out the previously recorded image information from the tape 60.

Figure 5:
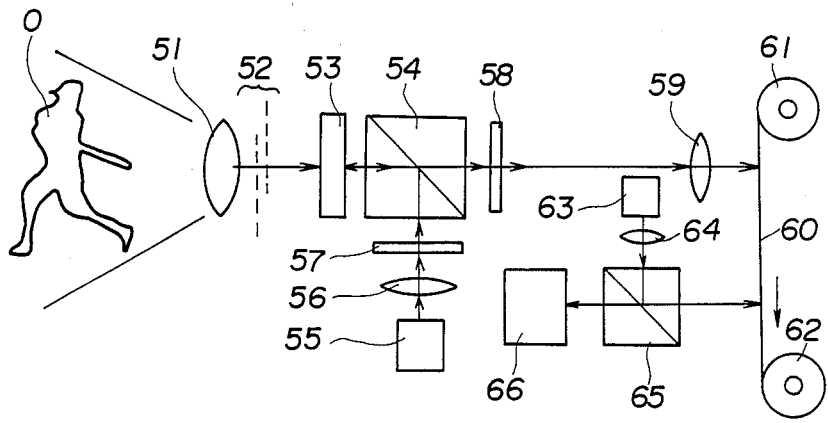
Figure 6:
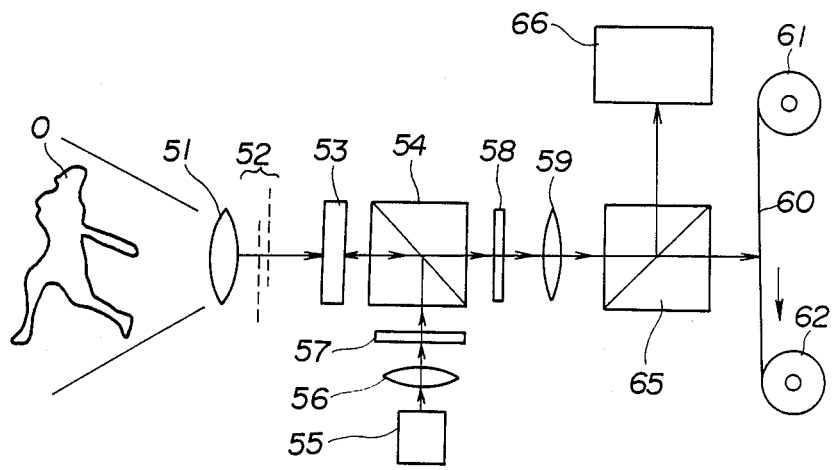

Next, descriptions will be given on fourth and fifth embodiments of the image pickup device according to the present invention, by referring to FIGS. 5 and 6, respectively. In FIGS. 5 and 6, those parts which are the same as those corresponding parts in FIG. 4 are designated by the same reference numerals, and a description thereof will be omitted.

In FIG. 5, the image pickup device comprises in addition to the elements of the third embodiment a light source 63, a lens 64, a semitransparent prism 65 and a signal processing device 66. The light emitted from the light source 63 is projected on a portion of the tape 60 pre-stored with the optical image information, through the lens 64 and the semitransparent prism 65. A portion of the light reflected at the tape 60 and passed through the semitransparent prism 65 is applied to the signal processing device 66.

The signal processing device 66 carries out a predetermined signal processing such as editing and electronic picture trimming on the image information read from the tape 60. The signal processing device 66 is made up of a spatial light modulator element, a reversible parallel memory, a parallel functional element, a function coupled element and the like. The signal processing device 66 may be designed to carry out a non-sequential but scanningless optical signal processing.

It is possible to project the optical image information passed through the semitransparent prism 65 directly on a monitoring screen (not shown) so that the optical image information stored on the tape 60 may be monitored. The arrangement shown in FIG. 5 allows the signal processing device 66 to carry out its signal processing frame by frame, as the frame of picture to be processed is stored on the tape 60 as a series of such frames and advancement of the frames is electromechanically controllable.

In FIG. 6, the semitransparent prism 65 is provided in an optical path between the lens 59 and the tape 60. As a result, a portion of the optical image information to be stored on the tape 60 is reflected by the semitransparent prism 65 and applied to the signal processing device 66. The signal processing device 66 carries out a predetermined signal processing such as editing, electronic picture trimming and light amplification on the optical image information.

It is possible to project the optical image information reflected by the semitransparent prism 65 directly on a monitoring screen (not shown) so that the optical image information to be stored on the tape 60 may be monitored.

Figure 7:
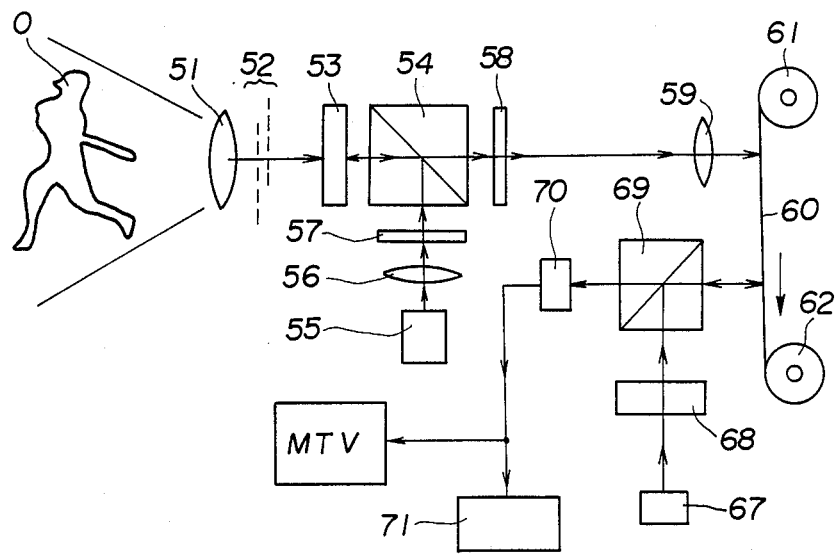

Next, a description will be given on a sixth embodiment of the image pickup device according to the present invention, by referring to FIG. 7. In FIG. 7, those parts which are the same as those corresponding parts in FIG. 4 are designated by the same reference numerals, and a description thereof will be omitted.

In FIG. 7, the image pickup device comprises in addition to the elements of the third embodiment a light source 67, an optical scanner 68, a semitransparent prism 69, a photodetector 70 such as a photodiode and a charge coupled device (CCD) line sensor, a signal processing circuit 71 and a monitoring television receiver MTV. A light emitted from the light source 67 is scanned by the optical scanner 68 and is thereafter projected on a portion of the tape 60 pre-stored with the optical image information. A portion of the light reflected at the tape 60 and passed through the semitransparent prism 65 is applied to the photodetector 70, and the photodetector 70 outputs a video signal corresponding to the recorded image information stored on the tape 60. The recorded optical image information may be monitored on the monitoring television receiver MTV by supplying thereto the output video signal of the photodetector 70. In addition, the video signal may be subjected to a predetermined signal processing such as editing and electronic picture trimming by supplying the video signal to the signal processing circuit 71.

Figure 8:
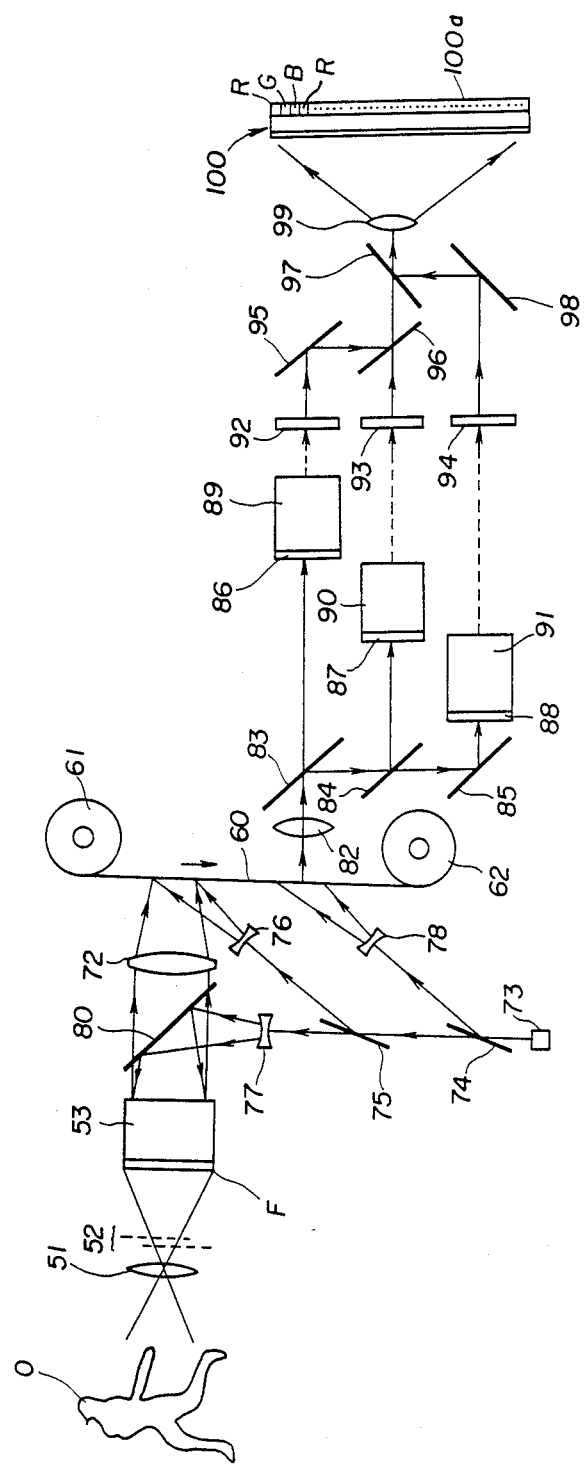

Next, a description will be given on a seventh embodiment of the image pickup device according to the present invention, by referring to FIGS. 8, 9A and 9B. In FIG. 8, those parts which are the same as those corresponding parts in FIG. 4 are designated by the same reference numerals, and a description thereof will be omitted. In the present embodiment, the storage and retrieval of the optical image information to and from the tape 60 are carried out by holography.

In FIG. 8, a color separation stripe filter F is provided between the optical shutter 52 and the optical modulator element 53. FIGS. 9A and 9B show examples of the color separation stripe filter F. In FIG. 9A, the color separation stripe filter F comprises color filter stripes R for passing red light, color filter stripes G for passing green light and color filter stripes B (only one shown) for passing blue light. The color filter stripes R, G and B are arranged in a predetermined sequence which is repeated. On the other hand, in FIG. 9B, the color separation stripe filter F comprises color filter stripes G for passing green light, color filter stripes M for passing magenta light and color filter stripes Ye (only one shown) for passing yellow light. The color filter stripes G, M and Ye are arranged in a predetermined sequence which is repeated.

Returning now to the description of FIG. 8, the image pickup device is provided with a lens 72 and a light source 73 for emitting a light which is used as a reading light for the optical modulator element 53 and a coherent light which is used in common for recording the hologram on the tape 60 and for reproducing the wavefront from the tape 60. For example, a semiconductor laser device may be used as the light source 73.

The light from the light source 73 which is used in common for reading the optical image from the optical modulator element 53 and the recording of the hologram is supplied to the optical modulator element 53 through a semitransparent mirror 74, a semitransparent mirror 75, a concave lens 77 and a semitransparent mirror 80. As a result, an optical image corresponding to the optical image of the object O appears on the optical modulator element 53, and this optical image is applied to the lens 72 through the semitransparent mirror 80 as a signal wave of the holography thereby making an image formation of the optical image on the tape 60 by the lens 72. The coherent light from the light source 73 is applied to the tape 60 through the semitransparent mirror 74, the semitransparent mirror 75 and the concave lens 76. For this reason, a hologram corresponding to the optical image of the object O appearing on the output side of the optical modulator element 53 is recorded on the tape 60. In other words, the optical image of the object O is subjected to the color separation and the resulting optical image is recorded on the tape 60 as a hologram.

In addition, the seventh embodiment shown in FIG. 8 is designed so that the hologram recorded on the tape 60 can be reproduced and displayed as a color picture. The wavefront of the hologram recorded on the tape 60 is reproduced by the coherent light emitted from the light source 73. The coherent light from the light source 73 is projected on the tape 60 as a reference light through a concave lens 78. As a result, the wavefront of the hologram is reproduced from the tape 60 and an optical image corresponding to the optical image of the object O is applied to a lens 82.

The optical image applied to the lens 82 is passed through a color separating system and separated lights are supplied individually to respective optical functional elements 89 through 91. The color separating system comprises semitransparent mirrors 83 and 84, a total reflection mirror 85 and optical gates 86 through 88 such as slit plates having the so-called slit pattern corresponding to the sequential arrangement of the color filter stripes constituting the color separation stripe filter F described before.

Each of the optical functional elements 89 through 91 comprises optionally a light amplifier such as microchannel light modulator mentioned before for intensifying the optical information inputted thereto, a photochromic glass for gamma correction, and an optical picture trimming device such as masks for removing undesired parts of the image. Output optical information from the optical functional elements 89 through 91 are supplied to optical gates 92 through 94 which are similar in construction to the optical gates 86 through 88. The optical information from the optical gates 89 through 91 are applied to a lens system 99 through an optical system for forming the optical image. This optical system for forming the optical image comprises a total reflection mirrors 95 and 98 and semitransparent mirrors 96 and 97. The optical image outputted from the lens system 99 is applied to an optical color display device 100, and a color picture corresponding to the optical image of the object O is displayed on an optical color picture display screen 100a of the color display device 100.

For example, the color display device 100 displays the color picture with a high luminance and high contrast on the color picture display screen 100a which may be relatively large compared with cathode ray tubes. It is possible to use as the color display device 100 a device which uses a combination of a microchannel light modulator having a light amplifying function and light emission plates made up of fluorescent substances of each color.

Figure 10:
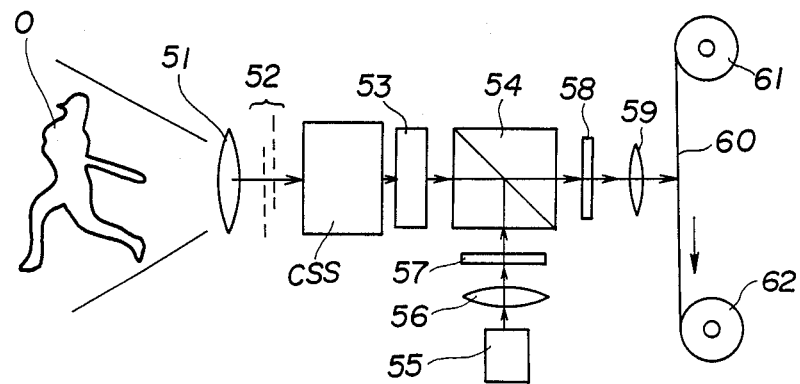
FIG. 10 generally shows an eighth embodiment of the image pickup device according to the present invention.

Next, a description will be given on an eighth embodiment of the image pickup device according to the present invention, by referring to FIG. 10. In FIG. 10, those parts which are the same as those corresponding parts in FIG. 4 are designated by the same reference numerals, and a description thereof will be omitted. In the present embodiment, a color separation system CSS is provided between the optical shutter 52 which is provided as an optional device when desired and the optical modulator element 53. The color separation system CSS has a function of separating the optical image of the object O into two or more optical images having mutually different wavelengths. The image formation of the two or more optical images from the color separation system CSS is made at independent regions on the optical modulator element 53.

FIGS. 11A through 11C show an embodiment of the color separation system CSS together with the imaging lens 51. FIGS. 11A, 11B and 11C show a plan view, a side view and a rear view of this embodiment, respectively. The color separation system CSS of this embodiment comprises a dichroic mirror Db for reflecting blue light and passing red and green lights, a dichroic mirror Dr for reflecting red light and passing green and blue lights, total reflection mirrors Mr1 through Mr3 provided in an optical path of the red light, total reflection mirrors Mb1 through Mb3 provided in an optical path of the blue light and total reflection mirrors Mg1 through Mg4 provided in an optical path of the green light. Ir denotes an image formation of an optical image due to a red component of the optical image of the object O, Ib denotes an image formation of an optical image due to a blue component of the optical image of the object O, and Ig denotes an image formation of an optical image due to a green component of the optical image of the object O. The same designations used in FIGS. 11A through 11C are employed in the figures which will be described later.

In the color separation system CSS shown in FIGS. 11A through 11C, the lengths of optical paths from a principal plane of the imaging lens 51 to the respective image formations Ir, Ib and Ig are identical. Further, the image formations Ir, Ib and Ig are arranged side by side on a single plane without overlapping each other. Accordingly, by using the color separation system CSS shown in FIGS. 11A through 11C, the image formation of the optical images of the three primary colors separated from the optical image of the object O can be arranged at independent regions on the optical modulator element 53.

Figure 12A:
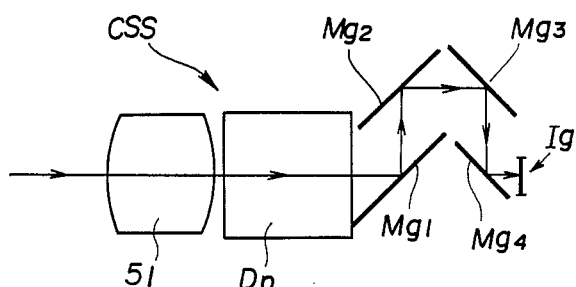
Figure 12B:
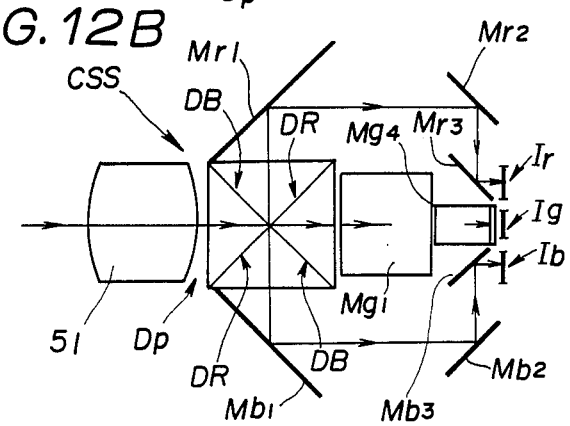
Figure 12C:
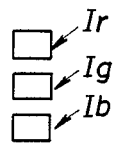

FIGS. 12A through 12C show another embodiment of the color separation system CSS together with the imaging lens 51. FIGS. 12A, 12B and 12C show a plan view, a side view and a rear view of this embodiment, respectively. The color separation system CSS of this embodiment uses a dichroic prism Dp in place of the dichroic mirrors Dr and Db. The dichroic prism Dp comprises a first dichroic mirror surface DR for reflecting the red light and passing the green and blue lights and a second dichroic mirror surface DB for reflecting the blue light and passing the green and red lights, where the first and second dichroic mirror surfaces DR and DB are arranged perpendicular to each other.

Similarly as in the case of the embodiment shown in FIGS. 11A through 11C, the lengths of optical paths from the principal plane of the imaging lens 51 to the respective image formations Ir, Ib and Ig are identical, and further, the image formations Ir, Ib and Ig are arranged side by side on a single plane without overlapping each other. Accordingly, by using the color separation system CSS shown in FIGS. 12A through 12C, the image formation of the optical images of the three primary colors separated from the optical image of the object O can also be arranged at independent regions on the optical modulator element 53.

Figure 13:
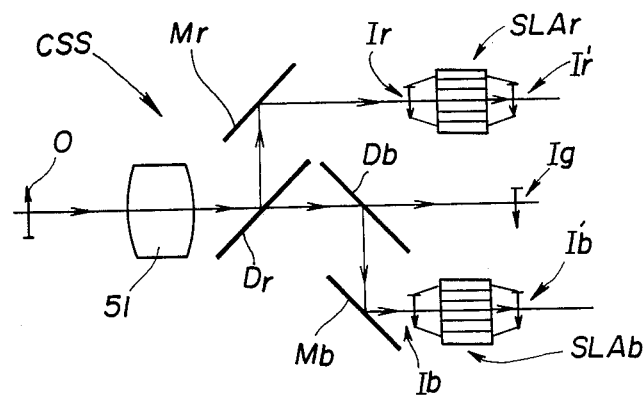

FIG. 13 shows still another embodiment of the color separation system CSS together with the imaging lens 51. In the color separation system CSS shown in FIG. 13, the total reflection mirrors Mg1 through Mg4 in the optical path for the green light, the total reflection mirrors Mr2 and Mr3 in the optical path for the red light and the total reflection mirrors Mb2 and Mb3 in the optical path for the blue light all shown in FIGS. 11A through 11C are omitted. However, the color separation system CSS shown in FIG. 13 is provided with optical path-length adjusting members SLAr and SLAb. In order to make the lengths of optical paths from the principal plane of the imaging lens 51 to respective image formations I'r, I'b and Ig identical, the optical path-length adjusting members SLAr and SLAb are arranged in the optical paths of the red and blue lights, respectively. As a result, the image formations I'r, I'b and Ig are arranged side by side on a single plane without overlapping each other.

Figure 14:
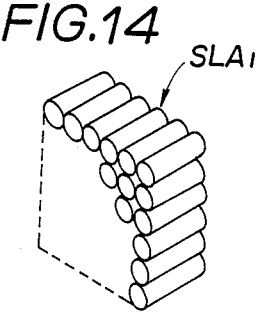
FIGS. 14 and 15 show embodiments of an optical path-length adjusting member used in the color separation system shown in FIG. 13.

FIG. 14 shows an embodiment of the optical path-length adjusting members SLAr and SLAb. In FIG. 14, an optical path-length adjusting member SLA1 comprises a minute lens array made up of rod lenses arranged as a cluster and cut to a predetermined length as shown. The rod lenses are distributed (refractive) index lenses, and a SELFOC (registered trademark) lens may be used therefor.

Figure 15:
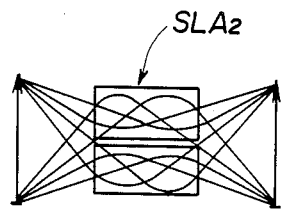

FIG. 15 shows another embodiment of the optical path-length adjusting members SLAr and SLAb. In FIG. 15, an optical path-length adjusting member SLA2 comprises rod lenses (only two shown) which are arranged to obtain an upright (erect) equimagnification image.

It is of course possible to change the lengths of the rod lenses so that a desired optical path-length is obtained. In other words, the optical path-length is easily adjustable.

FIG. 16 shows still another embodiment of the color separation system CSS together with the imaging lens 51. In the color separation system CSS shown in FIG. 16, the total reflection mirrors Mg1 through Mg4 in the optical path for the green light, the total reflection mirrors Mr2 and Mr3 in the optical path for the red light and the total reflection mirrors Mb2 and Mb3 in the optical path for the blue light shown in FIGS. 12A through 12C are omitted. However, the color separation system CSS shown in FIG. 16 is provided with the optical path-length adjusting members SLAr and SLAb. In order to make the lengths of optical paths from the principal plane of the imaging lens 51 to respective image formations I'r, I'b and Ig identical, the optical path-length adjusting members SLAr and SLAb are arranged in the optical paths of the red and blue lights, respectively. As a result, the image formations I'r, I'b and Ig are arranged side by side on a single plane without overlapping each other.

In the embodiments of the color separation system CSS described heretofore, the optical image of the object O is separated into the three primary colors, and the lengths of optical paths from the principal plane of the imaging lens 51 to the respective image formations Ir, Ib and Ig (or I'r, I'b and Ig) are made identical so that the image formations Ir, Ib and Ig (I'r, I'b and Ig) are arranged side by side on a single plane without overlapping each other. But descriptions will now be given on embodiments of the color separation system CSS which separates the optical image of the object O into two optical images of mutually different wavelengths, and lengths of optical paths from the principal plane of the imaging lens to these two optical images are set identical so that image formations of these two optical images become arranged side by side on a single plane without overlapping each other. FIGS. 17A through 22 show such embodiments of the color separation system CSS.

The color separation system CSS shown in FIGS. 17A and 17B comprises a dichroic mirror Dm for reflecting magenta light and passing green light, total reflection mirrors Mg1 through Mg4 provided in an optical path of the green light passed through the dichroic mirror Dm, total reflection mirrors Mm1 through Mm3 provided in an optical path of the magenta light reflected at the dichroic mirror Dm, and a color separation stripe filter F provided to an image formation of an optical image formed by the magenta light. FIG. 17A shows a side view and FIG. 17B shows a rear view of the color separation system CSS. Image surfaces Ig and Im of the two optical images respectively formed from the passed green light and the reflected magenta light become arranged side by side on a single plane without overlapping each other.

The color separation system CSS shown in FIG. 18 comprises a dichroic mirror Dm for reflecting magenta light and passing green light, a total reflection mirror Mm provided in an optical path of the magenta light reflected at the dichroic mirror Dm, an optical path-length adjusting member SLAm, and a color separation stripe filter F provided to an image formation of an optical image formed by the magenta light. Image surfaces Ig and Im of the two optical images respectively formed from the passed green light and the reflected magenta light become arranged side by side on a single plane without overlapping each other.

The color separation system CSS shown in FIGS. 19A and 19B uses a semitransparent mirror HM for passing a portion of the optical image information of the object O obtained through the imaging lens 51 and reflecting the remaining portion of the optical image information. FIG. 19A shows a side view and FIG. 19B shows a rear view of the color separation system CSS. Total reflection mirrors My1 through My4 are provided in an optical path of the light passed through the semitransparent mirror HM, and total reflection mirrors Mc1 through Mc3 are provided in an optical path of the light reflected at the semitransparent mirror HM. In addition, a color separation stripe filter F is provided to an image formation of an optical image formed by the light reflected at the semitransparent mirror HM. Image surfaces Iy and Ic of the two optical images respectively formed from the passed light and the reflected light become arranged side by side on a single plane without overlapping each other. Iy denotes the image formation of the optical image due to a yellow component of the optical image of the object O, and Ic denotes the image formation of the optical image due to a cyan component of the optical image of the object O.

The color separation system CSS shown in FIG. 20 also uses a semitransparent mirror Mm for passing a portion of the optical image information of the object O obtained through the imaging lens 51 and reflecting the remaining portion of the optical image information. A color separation stripe filter F is provided to an image formation of an optical image formed by the reflected light from the semitransparent mirror HM. An optical path-length adjusting member SLAm is provided subsequent to the color separation stripe filter F in the optical path. The image formations Iy and Ic of the two optical images respectively formed from the passed light and the reflected light become arranged side by side on a single plane without overlapping each other.

Figure 21:
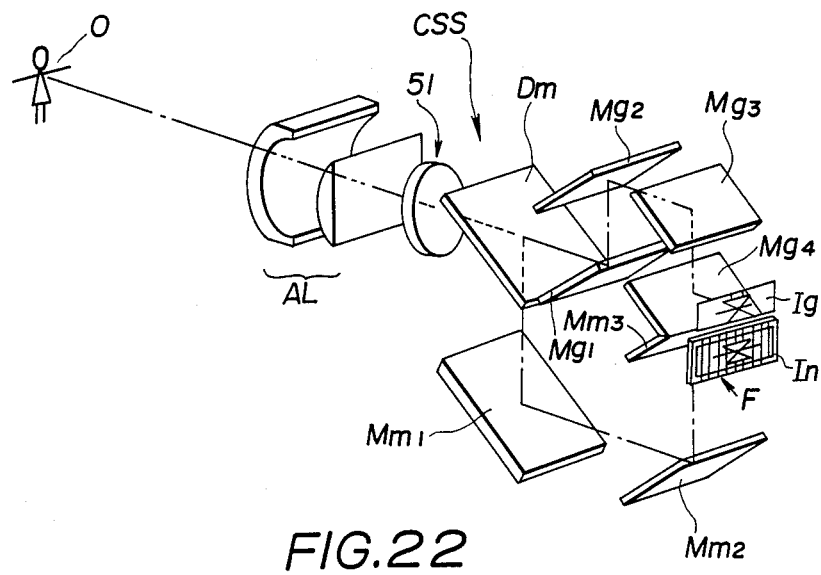

In a perspective view shown in FIG. 21, the color separation system SSC comprises an anamorphic lens AL provided in front of the imaging lens 51. Other parts of the color separation system SSC shown in FIG. 21 are identical to those corresponding parts in FIGS. 17A and 17B, and a description thereof will be omitted.

Figure 22:
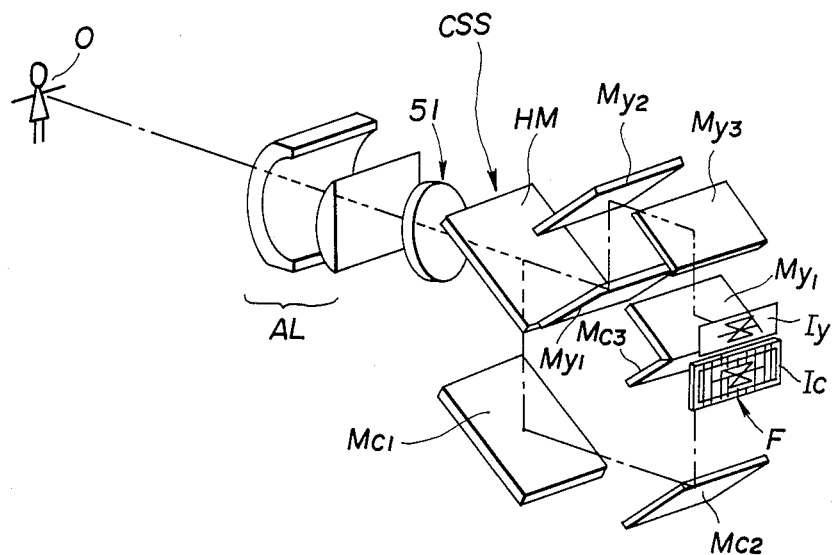

In a perspective view shown in FIG. 22, the color separation system SSC also comprises an anamorphic lens AL provided in front of the imaging lens 51. Other parts of the color separation system SSC shown in FIG. 22 are identical to those corresponding parts in FIGS. 19A and 19B, and a description thereof will be omitted.

In the color separation systems SSC shown in FIGS. 21 and 22, the two optical images obtained by the color separation are compressed in the vertical direction and imaged as respective image formations. As a result, when the image formations of the two optical images are arranged side by side on a single plane without overlapping each other, the total image becomes an approximately square thereby facilitating the image processing which is carried out in a subsequent stage of the image pickup device.

Figure 9A:
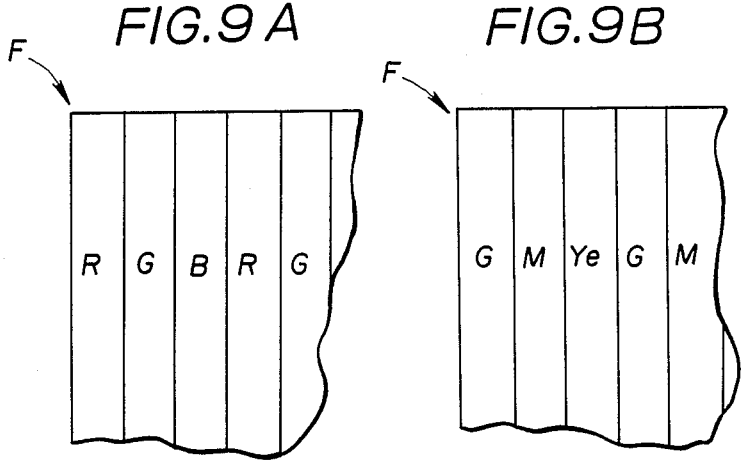
FIGS. 9A and 9B show in part examples of a color filter stripe used in the eighth embodiment.
Figure 9B:
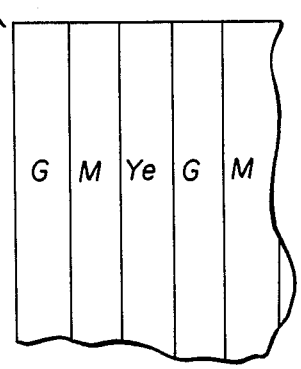

The color separation stripe filter F may have the constructions shown in FIGS. 9A and 9B, for example.

Next, descriptions will be given on ninth through twelfth embodiments of the image pickup device according to the present invention, by referring to FIGS. 23 through 26.

Figure 23:
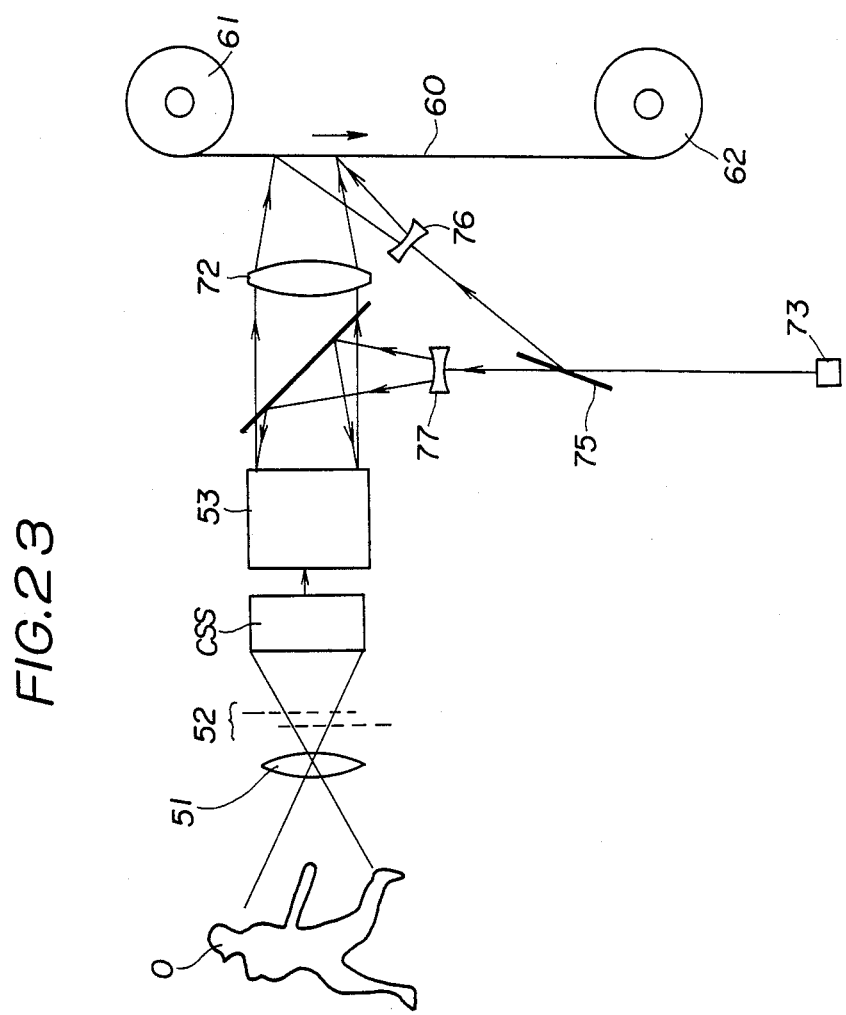
FIGS. 23 through 26 generally show ninth through twelfth embodiments of the image pickup device according to the present invention, respectively.

In FIG. 23 which shows the ninth embodiment, those parts which are the same as those corresponding parts in FIG. 8 are designated by the same reference numerals, and a description thereof will be omitted.

Figure 24:
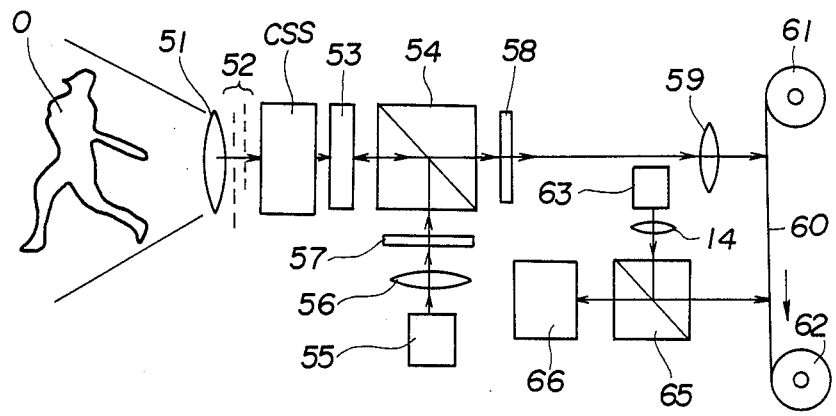

In FIG. 24 which shows the tenth embodiment, those parts which are the same as those corresponding parts in FIG. 5 are designated by the same reference numerals, and a description thereof will be omitted.

Figure 25:
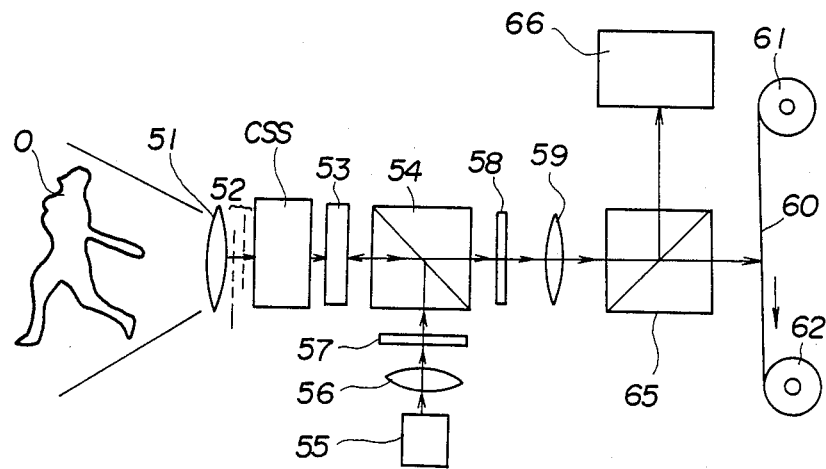

In FIG. 25 which shows the eleventh embodiment, those parts which are the same as those corresponding parts in FIG. 6 are designated by the same reference numerals, and a description thereof will be omitted.

Figure 26:
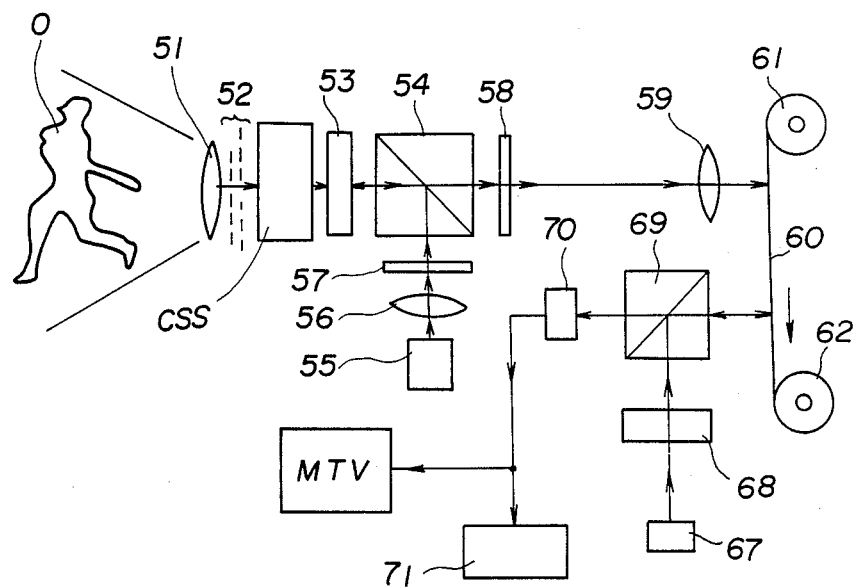

In FIG. 26 which shows the twelfth embodiment, those parts which are the same as those corresponding parts in FIG. 7 are designated by the same reference numerals, and a description thereof will be omitted.

In the ninth through twelfth embodiments, a color separation system CSS is optionally provided between the optical shutter 52 and the optical modulator element 53.

Therefore, according to the eighth through twelfth embodiments of the image pickup device, it is possible to make an image formation of the two or more optical images having different wavelengths on mutually different regions of the optical modulator element 53.

Next, a description will be given on a second embodiment of the optical modulator element which may be used for the optical modulator elements 3.

As described before in conjunction with FIG. 2, the optical image information is stored in the optical modulator element 3 (or 53) by the writing light Lw which is projected from the left in FIG. 2, and the stored optical image information is read from the optical modulator element 3 (or 53) by the reading light Lr which is projected from the right in FIG. 2. When changing the stored optical image information, that is, when erasing the stored optical information, the external voltage applied to the optical modulator element 3 (or 53) from the A.C. power source 41 is set to zero by use of a switch (not shown in FIG. 2) and an erasing light is applied to the optical modulator element 3 (or 53) from the left in FIG. 2. This erasing light must be supplied from an independent light source provided exclusively for erasing. However, there is a problem in that it is difficult without interrupting the writing light Lw to provide such a light source exclusively for the erasing at such a position that the erasing light is applied from the left of the optical modulator element 3 (or 53), that is, from the side of the imaging lens 1 (or 51). In other words, the construction of the image pickup device would be extremely complex on the side of the optical modulator element 3 (or 53) closer to the imaging lens 1 (or 51). The second embodiment of the optical modulator element eliminates this problem by using a mirror having a wavelength dependent characteristic.

Figure 27:
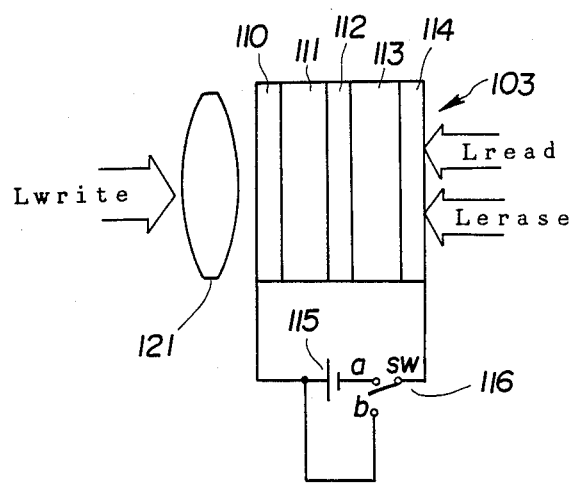
FIG. 27 shows a second embodiment of the optical modulator element.

FIG. 27 generally shows the second embodiment of the optical modulator element together with an essential part of the image pickup device. An optical (light) modulator element 103 comprises transparent electroconductive electrode layers 110 and 114, a photoconductive layer 111, a mirror 112 and an optical modulator layer 113. A power source 115 supplies an external voltage to the optical modulator element 103. A switch 116 which is normally connected to a terminal a and is switched over to a terminal b when erasing the optical image information. $L_{write}$ denotes the writing light, $L_{read}$ denotes the reading light and $L_{erase}$ denotes the erasing light.

Figure 28:
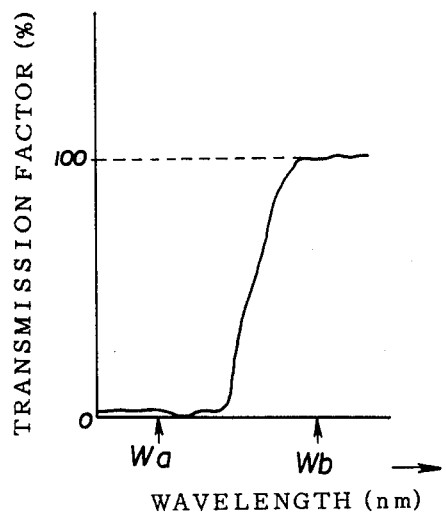
FIG. 28 shows a spectral characteristic of a mirror of the optical modulator element shown in FIG. 27.

FIG. 28 shows an embodiment of a spectral characteristic of the mirror 112 which constitutes an essential part of the optical modulator element 103. For example, a dichroic filter comprising multi-layers of $SiO_2$ and $TiO_2$ may be used for the mirror 112. In the present embodiment, a laser beam having a wavelength Wa shown in FIG. 28 is used as the reading light $L_{read}$, and a laser beam having a wavelength Wb shown in FIG. 28 is used as the erasing light $L_{erase}$.

As may be seen from FIG. 28, the reading light $L_{read}$ having the wavelength Wa is reflected by the mirror 112, thereby enabling the read-out of the stored optical image information. However, the erasing light $L_{erase}$ having the wavelength Wb is passed through the mirror 112 and reaches the photoconductive layer 111. As a result, the photoconductive layer 111 is made conductive by the erasing light $L_{erase}$ and the stored optical information is in effect erased. When this erasure takes place, the switch 116 is connected to the terminal b and the external voltage applied to the optical modulator element 103 becomes zero. Accordingly, there is no need to apply the erasing light to the optical modulator element 103 from the side of an imaging lens 121.

Figure 29:
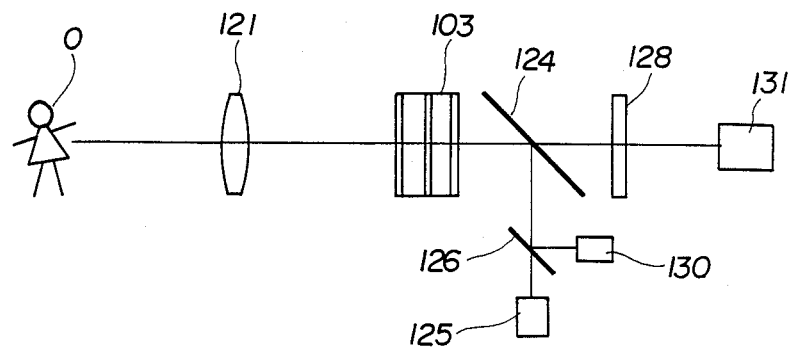
FIG. 29 generally shows the image pickup device according to the present invention applied with the optical modulator element shown in FIG. 27.

FIG. 29 generally shows the image pickup device according to the present invention applied with the optical modulator element 103 shown in FIG. 27. The image pickup device shown in FIG. 29 comprises the imaging lens 121 (1 or 51), the optical modulator element 103, semitransparent prisms 124 and 126, a first light source 125 for the reading light $L_{read}$, a polarizing plate 128, a second light source 130 for the erasing light $L_{erase}$ and a detector 131. It is readily apparent from FIG. 29 that the optical modulator 103 is applicable to any of the embodiments of the image pickup device described heretofore.

When the incoming optical image of the object O to the optical modulator element 103 is passed through the transparent electro-conductive electrode layer 110 and the image formation of the optical image is made on the photoconductive layer 111, an electrical resistance of the photoconductive layer 111 changes depending on the formed optical image. Specifically, the electrical impedance of the photoconductive layer 111 becomes low at the bright portions of the optical image formed on the photoconductive layer 111. A charge in correspondence with the brightness of the object O is distributed at a boundary surface of the photoconductive layer 111 and the mirror 112.

The optical modulator layer 113 is applied with an electrical field dependent on the optical image of the object O, through the photoconductive layer 111 and the mirror 112. For example, the optical modulator layer 113 is made of $LiNbO_3$. As a result, when the coherent reading light $L_{read}$ from the first light source 125 is projected to the optical modulator element 103 by way of the semitransparent mirrors 126 and 124, the reading light $L_{read}$ goes through the optical modulator layer 113 then returns therewithin being reflected by the mirror 112, when this occurs the polarization of the reading light $L_{read}$ is subject to change due to the electrooptic effect caused by the electrical field applied to the optical modulator layer 111, and the returned reading light $L_{read}$ reaches the polarizing plate 128. The change of the polarization of the light is transformed as a change in the intensity as passed through the polarizing plate 128 which is then detected by the detector 131. This detector 131 may be a projection screen in the case where the reading light $L_{read}$ is projected on a surface, a photodetector in the case where the reading light $L_{read}$ is a scanning beam, a light sensitive tape and the like.

Accordingly, the image formation of the optical image of the object O projected from the optical modulator element 103 having the transparent electro-conductive electrode layer 114 may be led to a photoelectric transducer element. In this case, a video signal corresponding to the optical image of the object O is outputted from the photoelectric transducer element and supplied to a monitoring television receiver, a signal processing circuit and the like.

On the other hand, when the switch 116 is connected to the terminal b for erasing, the potentials of the transparent electro-conductive electrode layers 110 and 114 become the same each other. Hence, by projecting the erasing light $L_{erase}$ through the mirror 112 to the photoconductive layer 111, the photoconductive layer 111 is made conductive thereby erasing the charge pattern.

In the case of the image pickup device which outputs a video signal or a signal representing the image information, the erasure of the stored optical image information may be carried out during a vertical blanking period of the video signal, for example.

Further, the present invention is not limited to these embodiments, but various variations and modifications may be made without departing from the scope of the present invention.

What is claimed is:

1. An image pickup device comprising:
   an optical modulator element having a function of storing an optical image information of an optical image which is formed thereon;
   imaging means including an imaging lens for making an image formation of an optical image of an object on said optical modulator element; and
   reading means for reading an optical image information from said optical modulator element and for generating an image information corresponding to the optical image of the object formed on said optical modulator element,
   said optical modulator element comprising in sequence a first transparent electro-conductive electrode layer, a photoconductive layer, a stopper layer, a dielectric mirror, a liquid crystal layer and a second transparent electro-conductive electrode layer, said first transparent electro-conductive electrode layer receiving a light from said imaging means as a writing light.

2. An image pickup device as claimed in claim 1 in which said reading means comprises photoelectric conversion means for converting the optical image information read from said optical modulator element into an electrical signal corresponding to the optical image of the object formed on said optical modulator element.

3. An image pickup device as claimed in claim 1 in which said imaging means further comprises an optical shutter.

4. An image pickup device comprising:
   an optical modulator element having a function of storing an optical image information of an optical image which is formed thereon;
   imaging means including an imaging lens for making an image formation of an optical image of an object on said optical modulator element; and
   reading means for reading an optical image information from said optical modulator element and for generating an image information corresponding to the optical image of the object formed on said optical modulator element,
   said reading means comprising an optical scanner for scanning said optical modulator element by a reading light when reading the optical image information from said optical modulator element, said optical modulator element comprising in stacked sequence a first transparent electro-conductive electrode layer, a photoconductive layer, a stopper layer, a dielectric mirror, a liquid crystal layer and a second transparent electro-conductive electrode layer, said first transparent electro-conductive electrode layer receiving a light from said imaging means as a writing light, said second transparent electro-conductive electrode layer receiving the reading light from said optical scanner.

5. An image pickup device comprising:
an optical modulator element having a function of storing an optical image information of an optical image which is formed thereon;
imaging means including an imaging lens for making an image formation of an optical image of an object on said optical modulator element; and
reading means for reading an optical image information from said optical modulator element and for generating an image information corresponding to the optical image of the object formed on said optical modulator element, said optical modulator element comprising in stacked sequence a first transparent electro-conductive electrode layer, a photoconductive layer, mirror, an optical modulator layer and a second transparent electro-conductive electrode layer, said first transparent electro-conductive electrode layer receiving a light from said imaging means as a writing light, said mirror having a predetermined spectral characteristic for selectively reflecting a light which has a wavelength greater than a predetermined wavelength and is projected to said second transparent electro-conductive electrode layer.

6. An image pickup device as claimed in claim 5 wherein said optical modulator layer is made of LiNbO$_3$.

7. An image pickup device comprising:
an optical modulator element having a function of storing an optical image information of an optical image which is formed thereon;
imaging means including an imaging lens for making an image formation of an optical image of an object on said optical modulator element; and
reading means for reading an optical image information from said optical modulator element and for generating an image information corresponding to the optical image of the object formed on said optical modulator element,
said reading means comprising means for reading the optical image information from said optical modulator element by a reading light, said optical modulator element comprising in stacked sequence a first transparent electro-conductive electrode layer, a photoconductive layer, mirror, an optical modulator layer and a second transparent electro-conductive electrode layer, said first transparent electro-conductive electrode layer receiving a light from said imaging means as a writing light, said second transparent electro-conductive electrode layer receiving the reading light from said optical scanner, said mirror having a predetermined spectral characteristic for selectively reflecting the reading light.

8. An image pickup device as claimed in claim 7 which further comprises a light source for supplying an erasing light, said erasing light being applied to said second transparent electro-conductive electrode layer when erasing the optical image information stored in said optical modulator element, said mirror allowing to pass the erasing light thereby making said photoconductive layer conductive.

9. An image pickup device as claimed in claim 3 in which said reading light has a wavelength shorter than a wavelength of said erasing light.

10. An image pickup device comprising:
an optical modulator element;
imaging means including an imaging lens for making an image formation of an optical image of an object on said optical modulator element;
reading means for reading a first optical image information from said optical modulator element and for generating a second optical image information corresponding to the optical image of the object formed on said optical modulator element;
flexible optically sensitive rewritable means having a function of storing said second optical image information which is formed thereon; and
writing means for writing said second optical image information generated from said reading means on said flexible optically sensitive rewritable means.

11. An image pickup device as claimed in claim 10 in which said optical modulator element is selected from a group including a liquid crystal optical modulator, a photoconductive Pockels cells, a spatial light modulator element such as a microchannel light modulator, and an element constituted by a photochromic material.

12. An image pickup device as claimed in claim 10 in which said flexible optically sensitive rewritable means is made of a recording material selected from a group including a photochromic material, a thermoplastic film and a photomagnetic material.

13. An image pickup device as claimed in claim 10 in which said optical modulator element comprises in stacked sequence a first transparent electro-conductive electrode layer, a photoconductive layer, a stopper layer, a dielectric mirror, a nematic liquid crystal layer and a second transparent electro-conductive electrode layer, said first transparent electro-conductive electrode layer receiving a light from said imaging means as a writing light.

14. An image pickup device as claimed in claim 10 in which said reading means comprises means for reading the first optical image information from said optical modulator element by a reading light.

15. An image pickup device as claimed in claim 14 in which said optical modulator element comprises in stacked sequence a first transparent electro-conductive electrode layer, a photoconductive layer, a stopper layer, a dielectric mirror, a nematic liquid crystal layer and a second transparent electro-conductive electrode layer, said first transparent electro-conductive electrode layer receiving a light from said imaging means as a writing light, said second transparent electro-conductive electrode layer receiving the reading light.

16. An image pickup device as claimed in claim 10 in which said optical modulator element comprises in stacked sequence a first transparent electro-conductive electrode layer, a photoconductive layer, a mirror, an optical modulator layer and a second transparent electro-conductive electrode layer, said first transparent conductive electrode layer receiving a light from said imaging means as a writing light, said second transparent electro-conductive electrode layer receiving a reading light, said mirror having a predetermined spectral characteristic for selectively reflecting a light which has a wavelength greater than a predetermined wavelength and is projected to said second transparent electro-conductive electrode layer as the reading light.

17. An image pickup device as claimed in claim 16 which further comprises a light source for supplying an erasing light, said erasing light being projected to said second transparent electro-conductive electrode layer when erasing the first optical image information stored in said optical modulator element, said mirror allowing to pass the erasing light thereby making said photoconductive layer conductive.

18. An image pickup device as claimed in claim 17 in which said reading light has a wavelength shorter than a wavelength of said erasing light.

19. An image pickup device as claimed in claim 10 which further comprises a color separation stripe filter provided between said imaging lens and said optical modulator element.

20. An image pickup device as claimed in claim 19 in which said writing means writes the second optical image information generated by said reading means on said flexible optically sensitive rewritable means as a hologram of the optical image subjected to a color separation in said color separation stripe filter.

21. An image pickup device as claimed in claim 10 which further comprises a color separation system for separating the optical image information from said imaging lens into two or more optical images of mutually different wavelengths, said two or more optical images being formed respectively at independent regions on said optical modulator element.

22. An image pickup device as claimed in claim 21 in which lengths of optical paths from a principal plane of said imaging lens to respective image formations of optical images formed by primary color components of light are identical each other and the image formations are arranged side by side on a single plane without overlapping each other.

23. An image pickup device as claimed in claim 10 in which said imaging means further comprises an optical shutter.

24. An image pickup device comprising:
   flexible optically sensitive rewritable means having a function of storing an optical image information of an optical image which is formed thereon;
   imaging means including an imaging lens for making an image formation of an optical image of an object on said flexible optically sensitive rewritable means; and
   reading means for reading the optical image information from said flexible optically sensitive rewritable means and for generating an image information in a form of an electrical signal corresponding to the optical image of the object formed on said flexible optically sensitive rewritable means.

25. An image pickup device as claimed in claim 24 in which said flexible optically sensitive rewritable means is made of a recording material selected from a group including a photochromic material, a thermoplastic film and a photomagnetic material.

* * * * *